(12) United States Patent
Hasegawa (10) Patent No.: US 9,154,176 B2
(45) Date of Patent: Oct. 6, 2015

(54) WIRELESS COMMUNICATION TERMINAL (71) Applicant: OLYMPUS CORPORATION, Tokyo (JP)

(72) Inventor: Yasuhiro Hasegawa, Hanno (JP)

(73) Assignee: OLYMPUS CORPORATION, Tokyo (JP)

( * ) Notice: Subject to any disclaimer, the term of this patent is extended or adjusted under 35 U.S.C. 154(b) by 176 days.

(21) Appl. No.: 13/666,539

(22) Filed: Nov. 1, 2012

(65) Prior Publication Data

US 2013/0115898 A1    May 9, 2013

(30) Foreign Application Priority Data

Nov. 4, 2011    (JP) .................................. 2011-242135

(51) Int. Cl.
*H04B 7/00*      (2006.01)
*H04B 1/401*     (2015.01)
*H04W 52/02*     (2009.01)

(52) U.S. Cl.
CPC ........... *H04B 1/401* (2013.01); *H04W 52/0277* (2013.01); *Y02B 60/50* (2013.01)

(58) Field of Classification Search
CPC .............................. H04W 84/18; H04W 84/20
USPC ..................... 455/41.2, 41.3, 575.6
See application file for complete search history.

(56) References Cited

U.S. PATENT DOCUMENTS

| | | | |
|---|---|---|---|
| 6,416,471 B1* | 7/2002 | Kumar et al. ................. | 600/300 |
| 7,860,030 B2* | 12/2010 | Ikeda ........................... | 370/255 |
| 8,254,838 B2* | 8/2012 | Feldstein ..................... | 455/41.2 |
| 8,310,359 B2* | 11/2012 | Abedi ......................... | 340/539.1 |
| 8,600,299 B2* | 12/2013 | Randall et al. ............... | 455/41.2 |
| 8,705,657 B2* | 4/2014 | Lai et al. ...................... | 375/302 |
| 8,755,269 B2* | 6/2014 | Jollota ......................... | 370/225 |
| 2004/0036772 A1* | 2/2004 | Pugel et al. .................. | 348/180 |
| 2007/0018832 A1* | 1/2007 | Beigel et al. ............... | 340/572.7 |
| 2007/0297347 A1* | 12/2007 | Ikeda ........................... | 370/254 |

(Continued)

FOREIGN PATENT DOCUMENTS

| | | |
|---|---|---|
| JP | 2004-503266 A | 2/2004 |
| JP | 2006-245665 A | 9/2006 |
| JP | 2008-172304 A | 7/2008 |

(Continued)

OTHER PUBLICATIONS

Office Action dated Jul. 14, 2015, issued in counterpart Japanese Patent Application No. 2011-242135, with English translation (8 pages).

*Primary Examiner* — April G Gonzales
(74) *Attorney, Agent, or Firm* — Westerman, Hattori, Daniels & Adrian, LLP (57) ABSTRACT

This wireless communication terminal can reduce power consumption required for channel change, and a channel information output unit detects communication channel information included in information represented by a signal received through an antenna and outputs the communication channel information. A wireless communication unit has a first operation mode and a second operation mode having relatively higher operational power consumption than the first operation mode, and transmits communication data to an external terminal through the antenna using a communication channel represented by the communication channel information output by the channel information output unit when the wireless communication module operates in the second operation mode.

15 Claims, 6 Drawing Sheets

(56) References Cited

U.S. PATENT DOCUMENTS

| | | | |
|---|---|---|---|
| 2008/0113621 A1* | 5/2008 | Parthasarathy | 455/41.3 |
| 2009/0007226 A1* | 1/2009 | Fujii | 726/1 |
| 2009/0082691 A1* | 3/2009 | Denison et al. | 600/544 |
| 2010/0279709 A1* | 11/2010 | Shahidi et al. | 455/456.2 |
| 2011/0261892 A1* | 10/2011 | Fujii | 375/259 |

FOREIGN PATENT DOCUMENTS

| | | |
|---|---|---|
| JP | 2010-81101 A | 4/2010 |
| JP | 2010-521223 A | 6/2010 |
| WO | 01/78831 A2 | 10/2001 |
| WO | 2008/112222 A2 | 9/2008 |
| WO | 2010/007739 A1 | 1/2010 |

* cited by examiner

WIRELESS COMMUNICATION TERMINAL

BACKGROUND OF THE INVENTION

1. Field of the Invention

The present invention relates to a wireless communication terminal.

Priority is claimed on Japanese Patent Application No. 2011-242135, filed on Nov. 4, 2011, the content of which is incorporated herein by reference.

2. Description of the Related Art

In the medical and healthcare fields, efforts are actively being made to effectively use biological data stored, diagnosis and treatment of diseases, or the like. Such biological data is collected from the surface of a human body or the inside of the body using a terminal having a variety of sensors. Also, the biological data collected by the terminal is transmitted to and stored in the storage device. When the storage device that stores biological data is used, if the terminal and the storage device are connected by a wired cable in order to transmit biological data, actions of a patient are limited. For this reason, it is preferable to configure the terminal to transmit biological data using wireless communication such that a patient can carry the terminal. Such needs are great in the medical field, in particular, implantable medical devices.

However, in such a wireless communication system, data is transmitted wirelessly, and thus there is a case in which communication errors occur due to various kinds of interference. For such a case, an interference avoidance technique in which a wireless communication system selects and uses channels that do not interfere with each other from among a plurality of channels is under examination. For example, a wireless communication system in which a storage device scans a plurality of channels in sequence to search for a response from a terminal and change a channel is known (for example, Published Japanese Translation No. 2010-521223 of the PCT International Publication).

SUMMARY OF THE INVENTION

According to a first aspect of the present invention, a wireless communication terminal includes a wireless communication antenna, a channel information output unit, and a wireless communication module. The channel information output unit detects communication channel information included in information represented by a signal received through the wireless communication antenna, and outputs the communication channel information. The wireless communication module has a first operation mode and a second operation mode having relatively higher operational power consumption than the first operation mode. When the wireless communication module operates in the second operation mode, it transmits communication data to an external terminal through the wireless communication antenna using a communication channel represented by the communication channel information output by the channel information output unit.

According to a second aspect of the present invention, the channel information output unit includes a demodulation unit which demodulates the information from the signal, and detects the communication channel information from the information demodulated by the demodulation unit.

According to a third aspect of the present invention, the channel information output unit further includes a holding unit which holds the communication channel information, and outputs the communication channel information when the wireless communication module switches to the second operation mode and operates.

According to a fourth aspect of the present invention, the channel information output unit outputs the communication channel information when the demodulation unit demodulates the information from the signal and the channel information output unit detects the communication channel information from the information demodulated by the demodulation unit.

According to a fifth aspect of the present invention, the wireless communication terminal further includes a rectification unit which rectifies the signal, and the demodulation unit operates with electric power rectified by the rectification unit.

According to a sixth aspect of the present invention, the channel information output unit outputs the communication channel information when a value of the electric power rectified by the rectification unit becomes a predetermined value or more.

According to a seventh aspect of the present invention, the wireless communication terminal further includes a first power switch unit which switches whether or not to supply the electric power rectified by the rectification unit to the demodulation unit.

According to an eighth aspect of the present invention, the first power switch unit performs start and stop of power supply to the demodulation unit at predetermined intervals.

According to a ninth aspect of the present invention, the first power switch unit stops power supply to the demodulation unit when the channel information output unit detects the communication channel information.

According to a tenth aspect of the present invention, the wireless communication module operates with the electric power rectified by the rectification unit.

According to an eleventh aspect of the present invention, the wireless communication terminal further includes a second power switch unit which switches whether or not to supply the electric power rectified by the rectification unit to the wireless communication module.

According to a twelfth aspect of the present invention, the second power switch unit starts power supply to the wireless communication module when the channel information output unit detects the communication channel information.

According to a thirteenth aspect of the present invention, the second power switch unit stops power supply to the wireless communication module when communication by the wireless communication module is finished.

According to a fourteenth aspect of the present invention, the wireless communication terminal is a terminal installed in a body.

According to a fifteenth aspect of the present invention, the wireless communication terminal is a terminal installed outside a body.

DETAILED DESCRIPTION OF THE INVENTION (First Embodiment)

Figure 1:
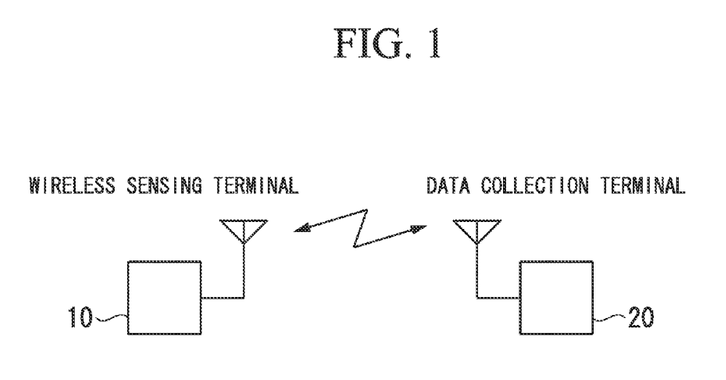
FIG. 1 is a schematic diagram showing a configuration of a biological data-monitoring system in a first embodiment of the present invention.

A first embodiment of the present invention will be described below with reference to drawings. FIG. 1 is a schematic diagram showing a configuration of a biological data-monitoring system in this embodiment. A biological data-monitoring system 1 includes a wireless sensing terminal 10 and a data collection terminal 20. The wireless sensing terminal 10 acquires biological data, such as a blood pressure, a pulse rate, an electrocardiogram, a heart rate, a blood oxygen level, a body temperature, a urinary sugar level, a blood sugar level, and the like, from the surface of a human body or the inside of the body using a variety of sensors. Also, the wireless sensing terminal 10 acquires device status data that represents statuses of respective units that the wireless sensing terminal 10 includes using a variety of sensors. Further, the wireless sensing terminal 10 wirelessly transmits the acquired biological data and device status data to the data collection terminal 20. The data collection terminal 20 collects and holds the biological data and the device status data wirelessly transmitted from the wireless sensing terminal 10. The wireless sensing terminal 10 is installed in a body. Also, the data collection terminal 20 is installed outside the body.

In this embodiment, a case in which the wireless sensing terminal 10 and the data collection terminal 20 perform wireless communication in a one-to-one fashion will be described. However, this embodiment can be applied to any relationship among one-to-N, M-to-one, and M-to-N relationships as well (N and M are natural numbers).

Figure 2:
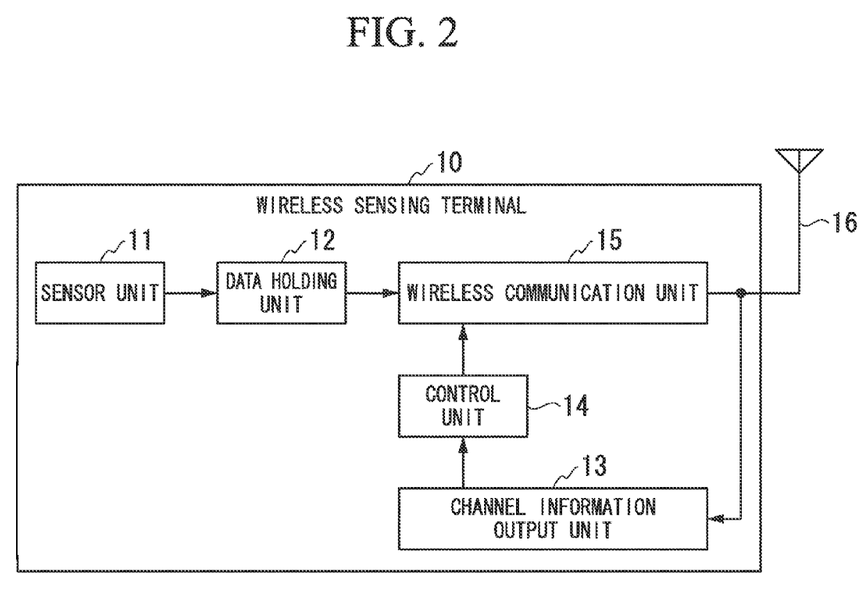
FIG. 2 is a block diagram showing a configuration of a wireless sensing terminal in the first embodiment of the present invention.

Next, a configuration of the wireless sensing terminal 10 will be described. FIG. 2 is a block diagram showing a configuration of the wireless sensing terminal 10 in the embodiment. In an example shown in FIG. 2, the wireless sensing terminal 10 includes a sensor unit 11, a data holding unit 12, a channel information output unit 13, a control unit 14, a wireless communication unit 15 (wireless communication module), and an antenna 16 (wireless communication antenna). The wireless sensing terminal 10 includes a battery (not shown). The battery supplies electric power to the respective units that the wireless sensing terminal 10 includes. A necessary configuration of this embodiment includes the channel information output unit 13, the wireless communication unit 15, and the antenna 16.

The sensor unit 11 is installed on the surface of the human body or in the body. The sensor unit 11 senses the blood pressure, the pulse rate, the electrocardiogram, the heart rate, the blood oxygen level, the body temperature, the urinary sugar level, the blood sugar level, and the like and acquires the biological data. Also, the sensor unit 11 senses the status of the respective units that the wireless sensing terminal 10 includes and acquires the device status data. The biological data or the device status data acquired by the sensor unit 11 will be referred to as "collection data" below. Also, the sensor unit 11 outputs the collection data to the data holding unit 12.

The data holding unit 12 acquires and holds the collection data output by the sensor unit 11. According to control of the control unit 14, the data holding unit 12 outputs the held collection data to the wireless communication unit 15. The channel information output unit 13 receives a signal transmitted from the data collection terminal 20 through the antenna 16. The channel information output unit 13 detects communication channel information (shown in FIG. 3) included in information represented by the received signal (in other words, information recorded in a communication packet obtained by demodulating the signal).

The communication channel information is information that specifies a channel used for wireless communication between the wireless sensing terminal 10 and the data collection terminal 20. The channel information output unit 13 outputs the detected communication channel information to the control unit 14. A detailed configuration of the channel information output unit 13 will be described later.

The control unit 14 outputs communication start instruction information including the communication channel information to the wireless communication unit 15 such that the wireless communication unit 15 performs communication using the channel specified in the communication channel information input from the channel information output unit 13. Also, the control unit 14 controls the data holding unit 12. The control unit 14 causes the collection data held in the data holding unit 12 to be output to the wireless communication unit 15.

The wireless communication unit 15 operates in two kinds of operation modes. The operation modes include an idle mode (first operation mode) and a transmission mode (second operation mode). When the wireless communication unit 15 operates in the idle mode, it only receives the communication start instruction information input from the control unit 14. At this time, the wireless communication unit 15 does not perform other processes. For this reason, when the wireless communication unit 15 operates in the idle mode, it can suppress power consumption. Also, the wireless communication unit 15 switches to the transmission mode when the communication start instruction information is input from the control unit 14 while the wireless communication unit 15 is operating in the idle mode. At this time, the wireless communication unit 15 operates in the transmission mode. When the wireless communication unit 15 operates in the transmission mode, it transmits the collection data input from the data holding unit 12 to the data collection terminal 20 through the antenna 16 using the channel specified by the communication channel information. When the wireless communication unit 15 operates in the transmission mode, it performs wireless transmission, and thus power consumption is higher than in the idle mode.

Figure 3:
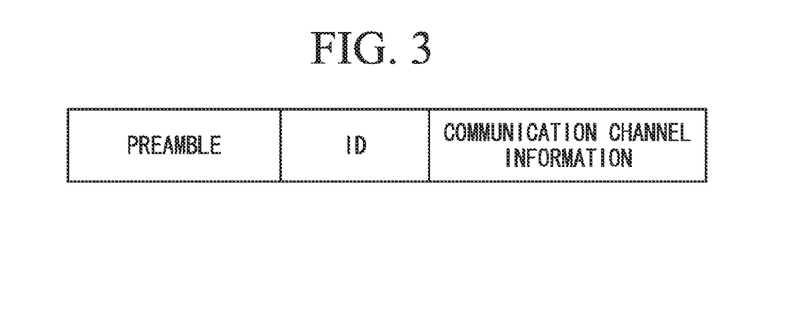
FIG. 3 is a schematic diagram showing a frame configuration of a communication packet including communication channel information in the first embodiment of the present invention.

Next, a frame configuration of a communication packet including communication channel information will be described. FIG. 3 is a schematic diagram showing a frame configuration of a communication packet including communication channel information in this embodiment. In an example shown in FIG. 3, a communication packet including communication channel information includes a preamble, an ID, and the communication channel information. The preamble is information that represents start of frame transmission. The ID is information that uniquely specifies a wireless sensing terminal. The communication channel information is as described above.

Figure 4:
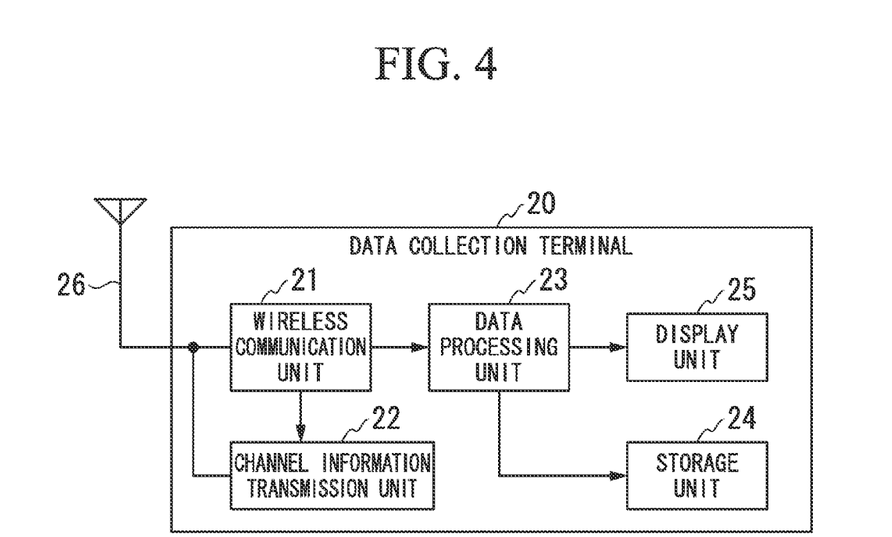
FIG. 4 is a block diagram showing a configuration of a data collection terminal in the first embodiment of the present invention.

Next, a configuration of the data collection terminal 20 will be described. FIG. 4 is a block diagram showing a configuration of the data collection terminal 20 in the embodiment. In an example shown in FIG. 4, the data collection terminal 20 includes a wireless communication unit 21, a channel information transmission unit 22, a data-processing unit 23, a storage unit 24, a display unit 25, and an antenna 26. In addition, the data collection terminal 20 includes a battery (not shown). The battery supplies electric power to the respective units that the data collection terminal 20 includes.

The wireless communication unit 21 selects a channel that is used when wireless communication with the wireless sensing terminal 10 is performed. The wireless communication unit 21 outputs communication channel information that is information specifying the selected channel to the channel information transmission unit 22. As a method of selecting the channel used when wireless communication with the wireless sensing terminal 10 is performed, for example, a channel of which measured receiving power is the lowest is selected from among a plurality of channels. Also, when reception of collection data from the wireless sensing terminal 10 is started, the wireless communication unit 21 transmits a data request signal to the wireless sensing terminal 10 through the antenna 26 using electromagnetic waves. A timing at which the data request signal is transmitted to the wireless sensing terminal 10 may be set to an appropriate timing such as an instruction of a user, a predetermined timing, or the like. Also, the wireless communication unit 21 receives the collection data that is transmitted from the wireless sensing terminal 10 using electromagnetic waves through the antenna 26. The wireless communication unit 21 outputs the received collection data to the data-processing unit 23.

When it is necessary to change the channel used for wireless communication with the wireless sensing terminal 10, the channel information transmission unit 22 outputs a signal including the communication channel information input from the wireless communication unit 21 to the wireless sensing terminal 10 through the antenna 26. The data-processing unit 23 converts a data format of the collection data input from the wireless communication unit 21 into a data format for storage, thereby generating data for storage. The data-processing unit 23 outputs the generated storage data to the storage unit 24. Also, the data-processing unit 23 converts the collection data input from the wireless communication unit 21 into display data of letters, images, or the like. The data-processing unit 23 outputs the converted display data to the display unit 25. The storage unit 24 stores the storage data input from the data-processing unit 23. The display unit 25 displays the display data input from the data-processing unit 23. With this configuration, the data collection terminal 20 can cause the display unit 25 to display the collection data transmitted from the wireless sensing terminal 10. Also, the data collection terminal 20 can cause the storage unit 24 to store the collection data.

Figure 5:
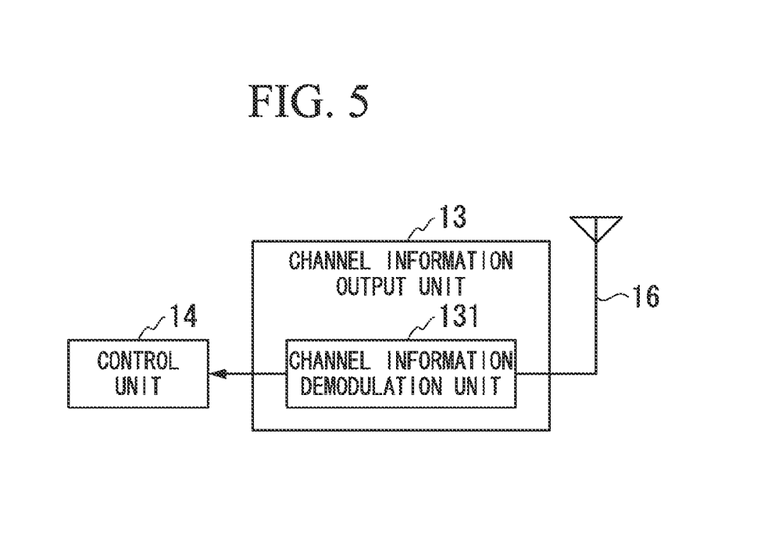
FIG. 5 is a block diagram showing a configuration of a channel information output unit in the first embodiment of the present invention.

Next, a configuration of the channel information output unit 13 that the wireless sensing terminal 10 includes will be described. FIG. 5 is a block diagram showing a configuration of the channel information output unit 13 in the embodiment. In an example shown in FIG. 5, the channel information output unit 13 includes a channel information demodulation unit 131. The channel information demodulation unit 131 receives a signal transmitted from the data collection terminal 20 through the antenna 16. Also, the channel information demodulation unit 131 demodulates the received signal and detects communication channel information. The channel information demodulation unit 131 outputs the detected communication channel information to the control unit 14.

Next, a transmission and reception sequence of collection data between the wireless sensing terminal 10 and the data collection terminal 20 in this embodiment will be described. The sensor unit 11 of the wireless sensing terminal 10 constantly acquires and outputs collection data to the data holding unit 12. The data holding unit 12 holds the collection data input from the sensor unit 11.

The wireless communication unit 21 of the data collection terminal 20 selects a channel that is used when wireless communication with the wireless sensing terminal 10 is performed. The wireless communication unit 21 outputs communication channel information that is information specifying the selected channel to the channel information transmission unit 22. The channel information transmission unit 22 outputs a signal including the communication channel information input from the wireless communication unit 21 to the wireless sensing terminal 10 through the antenna 26.

The channel information output unit 13 of the wireless sensing terminal 10 receives the signal transmitted from the data collection terminal 20 through the antenna 16. The channel information output unit 13 demodulates the received signal and detects the communication channel information. Also, the channel information output unit 13 outputs the detected communication channel information to the control unit 14. The control unit 14 outputs communication start instruction information including the communication channel information to the wireless communication unit 15 such that the wireless communication unit 15 performs communication using the channel specified in the communication channel information input from the channel information output unit 13. Also, the control unit 14 controls the data holding unit 12. The control unit 14 causes the collection data held in the data holding unit 12 to be output to the wireless communication unit 15. The data holding unit 12 outputs the held collection data to the wireless communication unit 15. When the communication start instruction information is input from the control unit 14, the wireless communication unit 15 transmits the collection data input from the data holding unit 12 to the data collection terminal 20 through the antenna 16 using electromagnetic waves. At this time, the wireless communication unit 15 transmits the collection data to the data collection terminal 20 using the channel specified in the communication channel information included in the communication start instruction information.

The wireless communication unit 21 of the data collection terminal 20 receives the collection data that is transmitted from the wireless sensing terminal 10 using the electromagnetic waves through the antenna 26. The wireless communication unit 21 outputs the received collection data to the data-processing unit 23. The data-processing unit 23 converts a data format of the collection data input from the wireless communication unit 21 into a data format for storage, thereby generating data for storage. The data-processing unit 23 outputs the generated storage data to the storage unit 24. Also, the data-processing unit 23 converts the collection data input from the wireless communication unit 21 into display data of letters, images, or the like. The data-processing unit 23 outputs the converted display data to the display unit 25. The storage unit 24 stores the storage data input from the data-processing unit 23. The display unit 25 displays the display data input from the data-processing unit 23.

As described above, according to the embodiment, the wireless communication unit 21 of the data collection terminal 20 determines a channel used for wireless communication with the wireless sensing terminal 10. Also, the channel information transmission unit 22 transmits a signal including communication channel information that specifies the channel determined by the wireless communication unit 21 to the wireless sensing terminal 10. The channel information output unit 13 of the wireless sensing terminal 10 detects the communication channel information included in information represented by the signal received from the data collection terminal 20 (in other words, information recorded in a communication packet obtained by demodulating the signal). The channel information output unit 13 outputs the communication channel information. The wireless communication unit 15 transmits collection data to the data collection terminal 20 through the antenna 16 using the channel specified in the communication channel information output by the channel information output unit 13.

With this configuration, the wireless communication unit 15 of the wireless sensing terminal 10 can specify a channel that is used for wireless communication by the data collection terminal 20 on the basis of communication channel information output by the channel information output unit 13. Thus, even when the data collection terminal 20 changes the channel used for wireless communication, the wireless communication unit 15 of the wireless sensing terminal 10 can perform wireless communication with the data collection terminal 20 without searching for the channel. Consequently, the wireless sensing terminal 10 can reduce power consumption required upon channel change.

In addition, as a channel that is used for transmission of a signal including communication channel information by the channel information transmission unit 22, one channel in a channel group used by the wireless communication unit 21 or a frequency channel other than the channel used by the wireless communication unit 21 may be used.

(Second Embodiment)

Next, a second embodiment of the present invention will be described below with reference to a drawing. Like in the first embodiment, a biological-data monitoring system in this embodiment includes a wireless sensing terminal and a data collection terminal. A difference between this embodiment and the first embodiment is in a configuration of a channel information output unit that the wireless sensing terminal has. Other configurations that the wireless sensing terminal has in this embodiment are the same as those in the first embodiment. Also, the data collection terminal in this embodiment has the same configuration as the data collection terminal 20 in the first embodiment.

Figure 6:
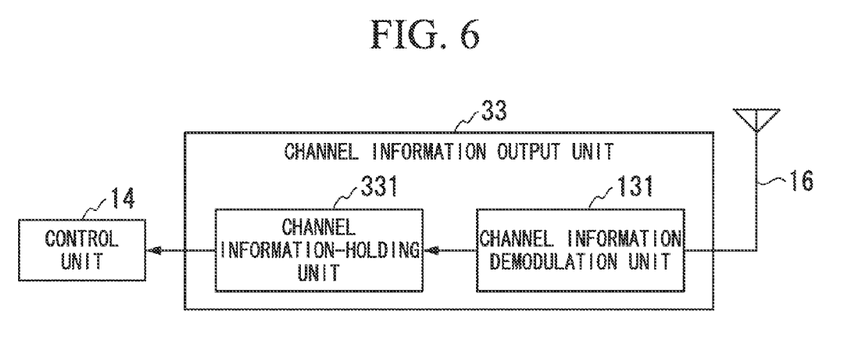
FIG. 6 is a block diagram showing a configuration of a channel information output unit in a second embodiment of the present invention.

Next, the configuration of the channel information output unit that the wireless sensing terminal has will be described. FIG. 6 is a block diagram showing a configuration of a channel information output unit 33 in the embodiment. In an example shown in FIG. 6, the channel information output unit 33 includes a channel information demodulation unit 131 and a channel information-holding unit 331.

The channel information demodulation unit 131 receives a signal transmitted from a data collection terminal 20 through an antenna 16. Also, the channel information demodulation unit 131 detects communication channel information included in information represented by the received signal (in other words, information recorded in a communication packet obtained by demodulating the signal). The channel information demodulation unit 131 outputs the detected communication channel information to the channel information-holding unit 331.

The channel information-holding unit 331 is a non-volatile memory. The channel information-holding unit 331 stores the communication channel information input from the channel information demodulation unit 131. Since the channel information-holding unit 331 is a non-volatile memory, it can hold the communication channel information after storing the communication channel information even without receiving power supply. Also, the channel information-holding unit 331 outputs the stored communication channel information to a control unit 14 on the basis of control of the control unit 14.

As described above, the channel information output unit 33 includes the channel information-holding unit 331. For this reason, the channel information output unit 33 can store communication channel information. Also, since the channel information-holding unit 331 is a non-volatile memory, it can hold the communication channel information even without receiving power supply. Thus, even when the wireless sensing terminal transmits collection data to the data collection terminal 20 in the case of starting-up after sleep, it can specify a channel that is used for communication using the communication channel information stored by the channel information-holding unit 331. For this reason, the wireless sensing terminal can rapidly transmit the collection data to the data collection terminal 20.

(Third Embodiment)

Next, a third embodiment of the present invention will be described with reference to a drawing. Like in the first embodiment, a biological-data monitoring system in this embodiment includes a wireless sensing terminal and a data collection terminal. A configuration of the data collection terminal is the same as the configuration of the data collection terminal 20 in the first embodiment.

Figure 7:
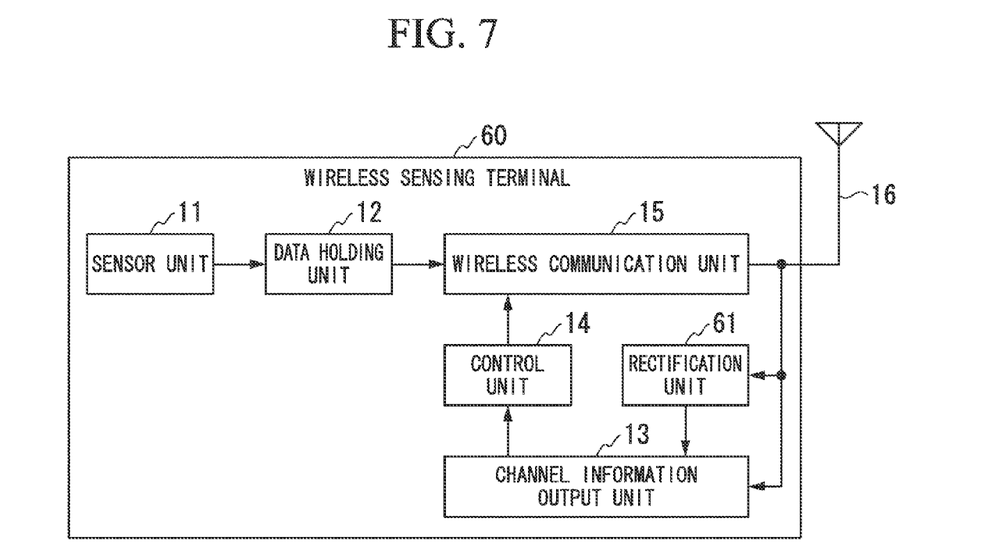
FIG. 7 is a block diagram showing a configuration of a wireless sensing terminal in a third embodiment of the present invention.

FIG. 7 is a block diagram showing a configuration of a wireless sensing terminal 60 in the embodiment. In an example shown in FIG. 7, the wireless sensing terminal 60 includes a sensor unit 11, a data holding unit 12, a channel information output unit 13, a control unit 14, a wireless communication unit 15, an antenna 16, and a rectification unit 61. The sensor unit 11, the data holding unit 12, the channel information output unit 13, the control unit 14, the wireless communication unit 15, and the antenna 16 are the same as the respective units in the first embodiment. The wireless sensing terminal 60 includes a battery (not shown). The battery supplies electric power to the respective units that the wireless sensing terminal 60 includes.

The rectification unit 61 receives electromagnetic waves (a signal) transmitted from a data collection terminal 20 through the antenna 16. Also, the rectification unit 61 rectifies the received electromagnetic waves, thereby converting the received electromagnetic waves into direct current voltage. The rectification unit 61 outputs the converted direct current voltage to the channel information output unit 13. In this way, the channel information output unit 13 can operate using the direct current voltage output by the rectification unit 61.

As described above, the wireless sensing terminal 60 includes the rectification unit 61. The channel information output unit 13 operates with electric power generated by the rectification unit 61, and detects communication channel information. Thus, it is possible to reduce power consumption required upon channel change.

(Fourth Embodiment)

Next, a fourth embodiment of the present invention will be described with reference to a drawing. Like in the first embodiment, a biological-data monitoring system in the embodiment includes a wireless sensing terminal and a data collection terminal. A configuration of the data collection terminal is the same as that of the data collection terminal 20 in the first embodiment.

Figure 8:
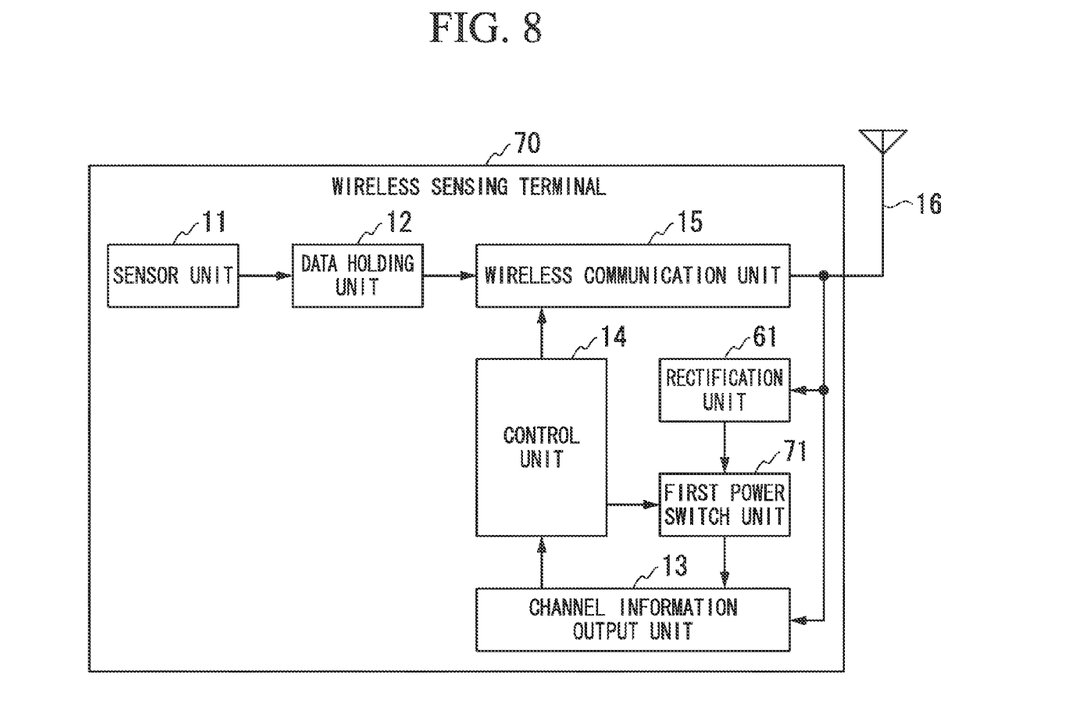
FIG. 8 is a block diagram showing a configuration of a wireless sensing terminal in a fourth embodiment of the present invention.

FIG. 8 is a block diagram showing a configuration of a wireless sensing terminal 70 in the embodiment. In an example shown in FIG. 8, the wireless sensing terminal 70 includes a sensor unit 11, a data holding unit 12, a channel information output unit 13, a control unit 14, a wireless communication unit 15, an antenna 16, a rectification unit 61, and a first power switch unit 71. The sensor unit 11, the data holding unit 12, the channel information output unit 13, the control unit 14, the wireless communication unit 15, and the antenna 16 are the same as the respective units in the first embodiment. The wireless sensing terminal 70 includes a battery (not shown). The battery supplies electric power to the respective units that the wireless sensing terminal 70 includes.

The rectification unit 61 receives electromagnetic waves (a signal) transmitted from a data collection terminal 20 through the antenna 16. Also, the rectification unit 61 rectifies the received electromagnetic waves, thereby converting the received electromagnetic waves into direct current voltage. The rectification unit 61 outputs the converted direct current voltage to the first power switch unit 71. According to control of the control unit 14, the first power switch unit 71 supplies the direct current voltage input from the rectification unit 61 to the channel information output unit 13. For example, the control unit 14 regularly instructs the first power switch unit 71 to start power supply. On the basis of the instruction to start power supply, the control unit 14 causes the voltage output by the rectification unit 61 to be supplied to the channel information output unit 13. After the channel information output unit 13 outputs communication channel information, the control unit 14 instructs the first power switch unit 71 to stop power supply. On the basis of the instruction to stop power supply, the control unit 14 stops the voltage output by the rectification unit 61 from being supplied to the channel information output unit 13. According to an operation mode of the wireless communication unit 15, a start period of power supply may be changed.

As described above, the wireless sensing terminal 70 includes the first power switch unit 71. On the basis of control of the control unit 14, the first power switch unit 71 supplies direct current voltage output by the rectification unit 61 to the channel information output unit 13. Also, on the basis of control of the control unit 14, the first power switch unit 71 stops supplying the voltage output by the rectification unit 61 to the channel information output unit 13. In this way, even when the power conversion efficiency of the rectification unit 61 is low, the wireless sensing terminal 70 can cause the channel information output unit 13 to operate using the voltage output by the rectification unit 61. Also, the wireless sensing terminal 70 can perform a channel change process.

(Fifth Embodiment)

Next, a fifth embodiment of the present invention will be described with reference to a drawing. Like in the first embodiment, a biological-data monitoring system in the embodiment includes a wireless sensing terminal and a data collection terminal. A configuration of the data collection terminal is the same as that of the data collection terminal 20 in the first embodiment.

Figure 9:
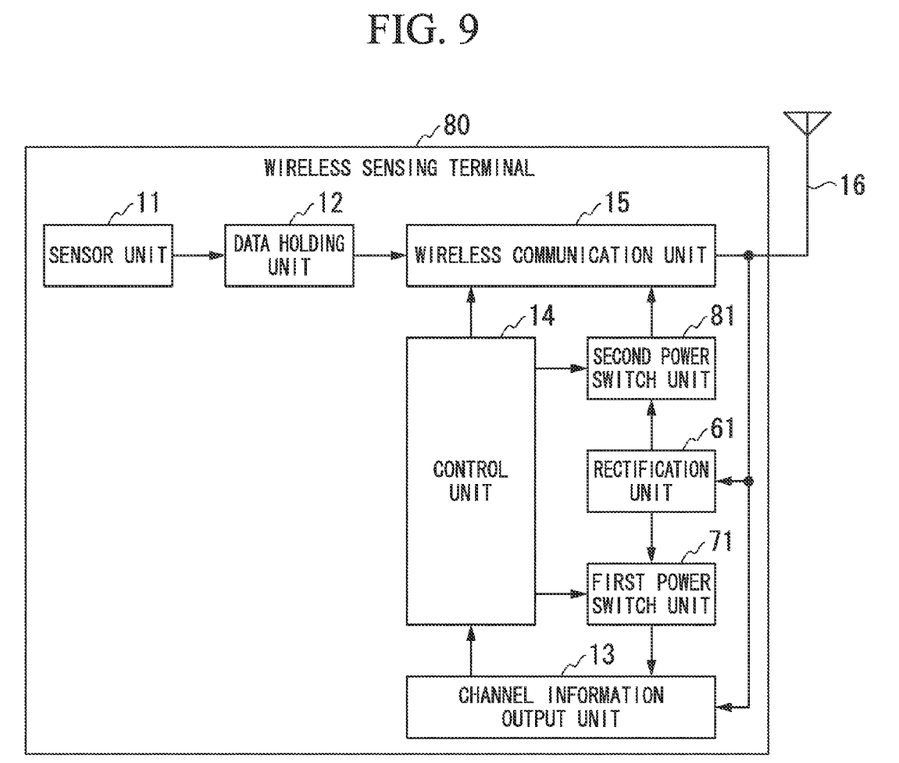
FIG. 9 is a block diagram showing a configuration of a wireless sensing terminal in a fifth embodiment of the present invention.

FIG. 9 is a block diagram showing a configuration of a wireless sensing terminal 80 in the embodiment. In an example shown in FIG. 9, the wireless sensing terminal 80 includes a sensor unit 11, a data holding unit 12, a channel information output unit 13, a control unit 14, a wireless communication unit 15, an antenna 16, a rectification unit 61, a first power switch unit 71, and a second power switch unit 81. The sensor unit 11, the data holding unit 12, the channel information output unit 13, the control unit 14, the wireless communication unit 15, and the antenna 16 are the same as the respective units in the first embodiment. The wireless sensing terminal 80 includes a battery (not shown). The battery supplies electric power to the respective units that the wireless sensing terminal 80 includes.

The rectification unit 61 receives electromagnetic waves (a signal) transmitted from a data collection terminal 20 through the antenna 16. Also, the rectification unit 61 rectifies the received electromagnetic waves, thereby converting the received electromagnetic waves into direct current voltage. The rectification unit 61 outputs the converted direct current voltage to the first power switch unit 71 and the second power switch unit 81. According to control of the control unit 14, the first power switch unit 71 supplies the direct current voltage input from the rectification unit 61 to the channel information output unit 13. According to control of the control unit 14, the second power switch unit 81 supplies the direct current voltage input from the rectification unit 61 to the wireless communication unit 15. For example, when communication channel information is input from the channel information output unit 13, the control unit 14 instructs the second power switch unit 81 to start power supply. On the basis of the instruction to start power supply, the control unit 14 causes the voltage output by the rectification unit 61 to be supplied to the wireless communication unit 15. After communication by the wireless communication unit 15 is finished, the control unit 14 instructs the second power switch unit 81 to stop power supply. On the basis of the instruction to stop power supply, the control unit 14 stops the voltage output by the rectification unit 61 from being supplied to the wireless communication unit 15.

As described above, the wireless sensing terminal 80 includes the second power switch unit 81. On the basis of control of the control unit 14, the second power switch unit 81 supplies direct current voltage output by the rectification unit 61 to the wireless communication unit 15. Also, on the basis of control of the control unit 14, the second power switch unit 81 stops supplying the voltage output by the rectification unit 61 to the wireless communication unit 15. In this way, the wireless communication unit 15 operates with electric power generated by the rectification unit 61, and can transmit collection data. Thus, it is possible to reduce consumption of the battery that the wireless sensing terminal 80 includes. Also, the first power switch unit 71 and the second power switch unit 81 are caused to interoperate, such that a channel change process and a collection data transmission process can be efficiently performed in cooperation with each other.

(Sixth Embodiment)

Next, a sixth embodiment of the present invention will be described with reference to a drawing. Like in the first embodiment, a biological-data monitoring system in the embodiment includes a wireless sensing terminal and a data collection terminal. In the first embodiment to the fifth embodiment, a channel used for wireless communication is specified by transmitting communication channel information from a data collection terminal to a wireless sensing terminal. However, in the embodiment, a channel used for wireless communication is specified by transmitting communication channel information from a wireless sensing terminal to a data collection terminal.

Figure 10:
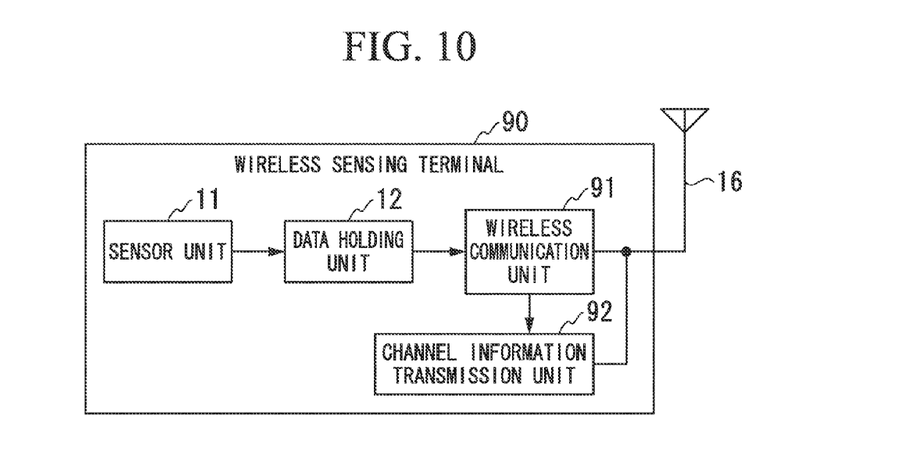
FIG. 10 is a block diagram showing a configuration of a wireless sensing terminal in a sixth embodiment of the present invention.

Next, a configuration of a wireless sensing terminal will be described. FIG. 10 is a block diagram showing a configuration of a wireless sensing terminal 90 in the embodiment. In an example shown in FIG. 10, the wireless sensing terminal 90 includes a sensor unit 11, a data holding unit 12, an antenna 16, a wireless communication unit 91, and a channel information transmission unit 92. The wireless sensing terminal 90 includes a battery (not shown). The battery supplies electric power to the respective units that the wireless sensing terminal 90 includes.

The sensor unit 11, the data holding unit 12, and the antenna 16 are the same as the respective units in the first embodiment. The wireless communication unit 91 selects a channel that is used when wireless communication with a data collection terminal 100 is performed. The wireless communication unit 91 outputs communication channel information that is information specifying the selected channel to the channel information transmission unit 92. As a method of selecting the channel used when wireless communication with the data collection terminal 100 is performed, for example, a channel that does not interfere with other wireless communication is selected from among a plurality of channels. Also, the wireless communication unit 91 transmits collection data input from the data holding unit 12 to the data collection terminal 100 through the antenna 16 using electromagnetic waves.

Figure 11:
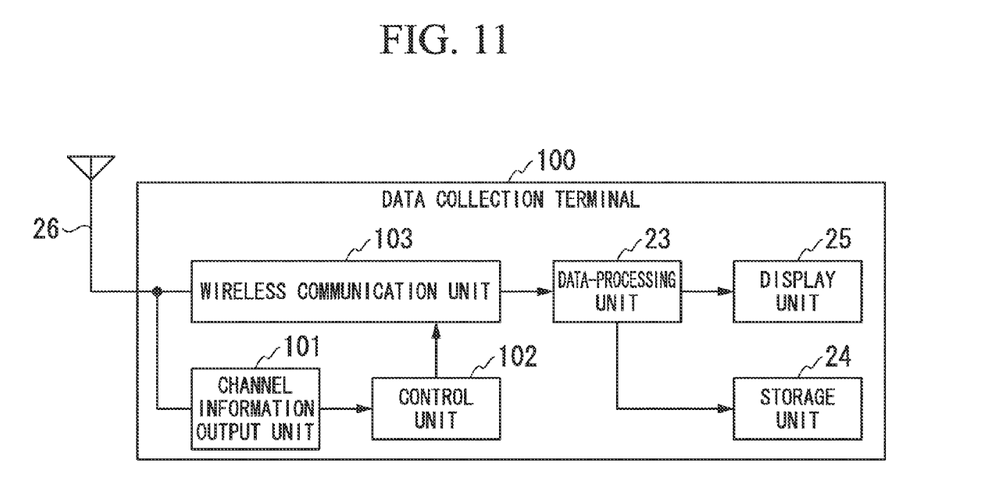
FIG. 11 is a block diagram showing a configuration of a data collection terminal in the sixth embodiment of the present invention.

Next, a configuration of the data collection terminal 100 will be described. FIG. 11 is a block diagram showing a configuration of the data collection terminal 100 in the embodiment. In an example shown in FIG. 11, the data collection terminal 100 includes a data-processing unit 23, a storage unit 24, a display unit 25, an antenna 26, a channel information output unit 101, a control unit 102, and a wireless communication unit 103. The data collection terminal 100 includes a battery (not shown). The battery supplies electric power to the respective units that the data collection terminal 100 includes.

The data-processing unit 23, the storage unit 24, the display unit 25, and the antenna 26 are the same as the respective units in the first embodiment. The channel information output unit 101 receives a signal transmitted from the wireless sensing terminal 90 through the antenna 26. The channel information output unit 101 detects the communication channel information included in information represented by the received signal (in other words, information recorded in a communication packet obtained by demodulating the signal). The communication channel information is the information that specifies the channel used for wireless communication between the wireless sensing terminal 90 and the data collection terminal 100. Also, the channel information output unit 101 outputs the detected communication channel information to the control unit 102. The control unit 102 outputs communication start instruction information including the communication channel information to the wireless communication unit 103 such that the wireless communication unit 103 performs communication using the channel specified in the communication channel information input from the channel information output unit 101. When the communication start instruction information is input from the control unit 102, the wireless communication unit 103 starts reception of collection data transmitted from the wireless sensing terminal 90 through the antenna 16.

As described above, according to the embodiment, the wireless communication unit 91 of the wireless sensing terminal 90 determines a channel used for wireless communication with the data collection terminal 100. Also, the channel information transmission unit 92 transmits a signal including communication channel information that specifies the channel determined by the wireless communication unit 91 to the data collection terminal 100. The channel information output unit 101 of the data collection terminal 100 detects the communication channel information included in information represented by the signal received from the wireless sensing terminal 90 (in other words, a communication packet obtained by demodulating the signal). The channel information output unit 101 outputs the communication channel information. The wireless communication unit 103 receives collection data transmitted from the wireless sensing terminal 90 using the channel specified in the communication channel information output by the channel information output unit 101.

With this configuration, the wireless communication unit 103 of the data collection terminal 100 can specify a channel that is used for wireless communication by the wireless sensing terminal 90 on the basis of communication channel information output by the channel information output unit 101. Thus, even when the wireless sensing terminal 90 changes the channel used for wireless communication, the wireless communication unit 103 of the data collection terminal 100 can perform wireless communication with the wireless sensing terminal 90 without searching for the channel. Consequently, the data collection terminal 100 can reduce power consumption required upon channel change.

As a channel that is used for transmission of a signal including communication channel information by the channel information transmission unit 92, one channel in a channel group used by the wireless communication unit 91 or a frequency channel other than the channel used by the wireless communication unit 91 may be used.

Although the first embodiment to the sixth embodiment of the present invention have been described in detail above with reference to the drawings, detailed configurations are not limited to the embodiments. Within a range not departing from the spirit of the present invention, additions, omissions, replacements and other modifications can be made in the configurations. For example, it has been described in the first to sixth embodiments that a wireless sensing terminal and a data collection terminal perform wireless communication in a one-to-one fashion, but the present invention can be applied to any relationship among one-to-N, M-to-one, and M-to-N relationships as well (N and M are natural numbers).

The present invention is not limited to the description made above, but is limited only by the scope of the appended claims.

What is claimed is:

1. A wireless communication terminal comprising:
   a wireless communication antenna;
   a channel information output unit which detects communication channel information that is included in information in a communication packet received through the wireless communication antenna and that represents the communication channel used in a wireless communication, and which outputs the communication channel information; and
   a wireless communication module which has a first operation mode and a second operation mode having relatively higher operational power consumption than the first operation mode, and transmits communication data to an external terminal through the wireless communication antenna using a communication channel represented by the communication channel information output by the channel information output unit when the wireless communication module operates in the second operation mode, wherein
   when the wireless communication module operates in the first operation mode if the wireless communication module receives communication start instruction information that start to transmit the communication data, the wireless communication module switches to the second operation mode;

the wireless communication module is connected to the wireless communication antenna without the channel information output unit;

the channel information output unit is connected to the wireless communication antenna without the wireless communication module; and the channel information output unit inputs the communication packet from the wireless communication antenna without the wireless communication module.

2. The wireless communication terminal according to claim 1, wherein the channel information output unit comprises a demodulation unit which demodulates the information from the signal, and detects the communication channel information from the information demodulated by the demodulation unit.

3. The wireless communication terminal according to claim 2, wherein the channel information output unit further comprises a holding unit which holds the communication channel information, and outputs the communication channel information when the wireless communication module switches to the second operation mode and operates.

4. The wireless communication terminal according to claim 2, wherein the channel information output unit outputs the communication channel information when the demodulation unit demodulates the information from the signal and the channel information output unit detects the communication channel information from the information demodulated by the demodulation unit.

5. The wireless communication terminal according to claim 2, further comprising:

a rectification unit which rectifies the signal, wherein the demodulation unit operates with electric power rectified by the rectification unit.

6. The wireless communication terminal according to claim 5, wherein the channel information output unit outputs the communication channel information when a value of the electric power rectified by the rectification unit becomes a predetermined value or more.

7. The wireless communication terminal according to claim 5, further comprising:

a first power switch unit which switches whether or not to supply the electric power rectified by the rectification unit to the demodulation unit.

8. The wireless communication terminal according to claim 7, wherein the first power switch unit performs start and stop of power supply to the demodulation unit at predetermined intervals.

9. The wireless communication terminal according to claim 7, wherein the first power switch unit stops power supply to the demodulation unit when the channel information output unit detects the communication channel information.

10. The wireless communication terminal according to claim 5, wherein the wireless communication module operates with the electric power rectified by the rectification unit.

11. The wireless communication terminal according to claim 10, further comprising:

a second power switch unit which switches whether or not to supply the electric power rectified by the rectification unit to the wireless communication module.

12. The wireless communication terminal according to claim 11, wherein the second power switch unit starts power supply to the wireless communication module when the channel information output unit detects the communication channel information.

13. The wireless communication terminal according to claim 12, wherein the second power switch unit stops power supply to the wireless communication module when communication by the wireless communication module is finished.

14. The wireless communication terminal according to claim 1, wherein the wireless communication terminal is a terminal installed in a body.

15. The wireless communication terminal according to claim 1, wherein the wireless communication terminal is a terminal installed outside a body.

* * * * *